H. J. GERWE.
METAL WHEEL AND METHOD OF MAKING SAME.
APPLICATION FILED JULY 12, 1916.
1,258,403.
Patented Mar. 5, 1918.
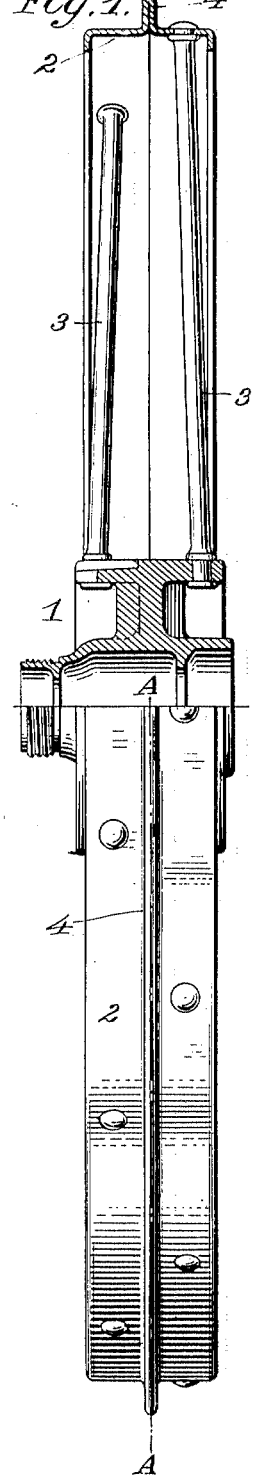
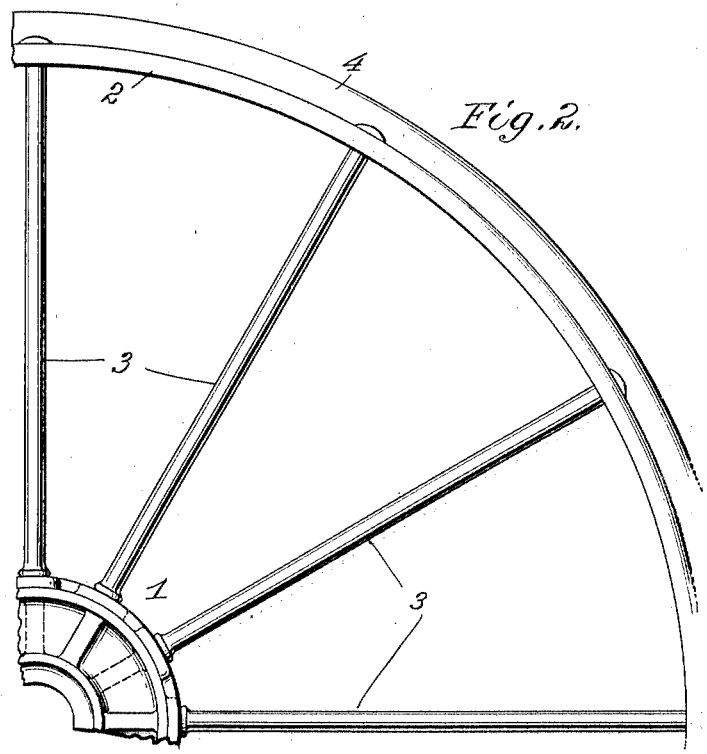
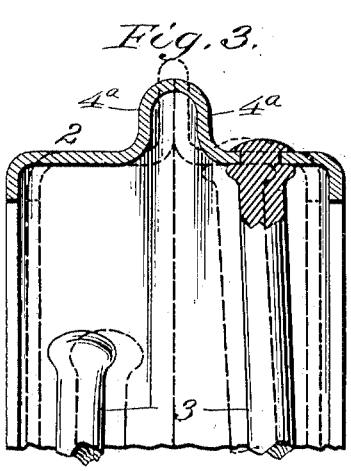
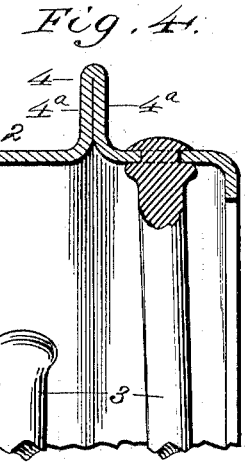
Inventor
N. J. Gerwe
By his Attorneys
Rogers, Kennedy & Campbell.

UNITED STATES PATENT OFFICE.

HENRY J. GERWE, OF DAVENPORT, IOWA, ASSIGNOR TO G. WATSON FRENCH, NATHANIEL FRENCH, JOSEPH L. HECHT, AND W. H. STACKHOUSE, ALL OF DAVENPORT, IOWA, COMPOSING THE FIRM OF FRENCH & HECHT, OF DAVENPORT, IOWA.

METAL WHEEL AND METHOD OF MAKING SAME.

1,258,403.  Specification of Letters Patent.  Patented Mar. 5, 1918.

Application filed July 12, 1916. Serial No. 108,823.

*To all whom it may concern:*

Be it known that I, HENRY J. GERWE, a citizen of the United States, residing at Davenport, in the county of Scott and State of Iowa, have invented certain new and useful Improvements in Metal Wheels and Methods of Making Same, of which the following is a specification, reference being had therein to the accompanying drawing.

This invention relates to metal wheels and the method of making the same, and has particular reference to metal wheels in which two ranks of spokes are fixedly connected at their inner and outer ends respectively with the hub and rim, the primary object of the invention being to produce a wheel in which the spokes of the two ranks will be under tension.

With this end in view the invention consists broadly in applying tension to the spokes of the two ranks by displacing the spokes at one end where they are connected to one of the members of the wheel, in a direction axially of the wheel, the displacement being such as to slightly lengthen or stretch the spokes and thereby subject them to a tension pull, the spokes being retained in their displaced condition in order to maintain the tension thereon.

The invention also consists in the improved tension wheel produced in accordance with said method.

In the more specific method of procedure, a wheel is formed by connecting, in any appropriate and suitable manner, two series or ranks of spokes at their inner ends with a hub and at their outer ends with a rim, the two ranks lying respectively on opposite sides of a radial plane passing through the hub and rim. The rim is then permanently deformed, preferably by contracting the same in an axial direction, with the result that the connected ends of the two ranks of spokes will be displaced axially and caused to approach each other and will assume a greater angle relatively to said radial plane. This action will stretch and lengthen the spokes and will place them under a tension pull, which, due to the permanent contraction or deformation of the rim, will be permanently maintained.

In the accompanying drawings:

Figure 1 is a central sectional elevation taken axially through a wheel made in accordance with my invention.

Fig. 2 is a side elevation of the same.

Fig. 3 is a longitudinal sectional elevation on an enlarged scale through one side of the wheel showing the relation of the spoke hub and rim before the latter is deformed to place the spokes under tension.

Fig. 4 is a similar view showing the parts after the rim has been deformed and the spokes placed under tension.

Referring to the drawings:

In carrying my improved method into operation in the preferred manner of procedure, I provide a hub 1, a rim 2 and two series of spokes 3, 3, the rim being provided between its edges with an outwardly extending hollow annular rib 4. By suitable means the two series of spokes are connected fixedly at their inner ends with the hub, as for instance by a riveting or heading operation, and are connected fixedly at their outer ends by a similar operation with the rim, the spokes being arranged in two ranks disposed on opposite sides of a radial plane extending through the hub and center of the rim as indicated by the dotted line A in Fig. 1. The two ranks of spokes are preferably arranged so that they will incline slightly toward each other as their outer ends are approached, the ranks being thus separated in an axial direction a greater distance from each other where they are connected with the hub than where they are connected with the rim. I next, by suitable means, contract the rim axially by collapsing the hollow annular rib 4, thereby forcing the two radial walls 4$^a$ of said rib together and in firm and solid contact with each other, as shown in Fig. 4. The effect of this action will be to permanently deform the rim and displace the connected ends of the two ranks of spokes in an axial direction, causing the two ranks to approach each other and causing them to assume a greater angle relative to the radial plane A than they previously occupied. The result of the greater angularity or inclination of the spokes is to increase their length, which increase is effected by the stretch of the spokes endwise which will subject them to a tension pull. The tension on the spokes is maintained by reason of the permanent contraction or deformation of the rim, since after the hollow rib is collapsed and assumes a solid form as shown in Fig. 4, it will remain permanently in this condition.

The result of the method of procedure described is to place all of the spokes of the two ranks under a uniform and decided tension, thereby producing a tension wheel.

The hollow annular rib on the rim, after it has been collapsed and condensed as described, forms in effect a solid annular radial projection, which in the action of the wheel will increase its tractive effect and will effectually prevent side slipping or sluing.

In the foregoing description I have disclosed the preferred manner of practising my improved method, but it will be manifest that the invention is not limited to the exact method of procedure described but may be variously changed without departing from the limits of my invention, the underlying and novel feature of which resides in the displacement of the ends of the two ranks of spokes axially to cause the spokes to be stretched or lengthened and thereby placed under a tension pull. It will be understood therefore that my invention is not limited either in respect to the method of procedure or the form and construction of the completed wheel, except in so far as such limitations are specified in the claims.

Having thus described my invention, what I claim is:

1. The method of placing under tension the spokes of a wheel having two ranks connected to the rim and hub members, which method consists in deforming one of said members to displace the connected ends of the spokes in a direction axially of the wheel to increase their length, and maintaining said member in its deformed condition.

2. The method of placing under tension the spokes of a wheel having two ranks connected to the rim and hub members, which method consists in permanently deforming one of said members to displace the connected ends of the spokes in a direction axially of the wheel to increase their length.

3. The method of placing under tension the spokes of a wheel having two ranks connected with the rim and hub, which method consists in deforming the rim to displace the connected ends of the spokes in a direction axially of the wheel to lengthen the spokes, and maintaining the rim in its deformed condition.

4. The method of placing under tension the spokes of a wheel having two ranks connected with the rim and hub, which method consists in permanently deforming the rim to displace the connected ends of the spokes in a direction axially of the wheel to lengthen the spokes.

5. The method of placing under tension the spokes of a wheel having two ranks connected with the hub and rim, which method consists in displacing the outer ends of the spokes of the two ranks toward each other axially of the wheel, and maintaining said ranks in their displaced positions.

6. The method of placing under tension the spokes of a wheel having two ranks connected with the hub and rim, which method consists in contracting the rim in an axial direction to displace the connected ends of the spokes in an axial direction to lengthen them, and maintaining the rim in its contracted condition.

7. The method of making metal tension wheels, which consists in providing a hub, and a rim with an annular hollow radial rib, connecting two ranks of spokes at their ends respectively with the hub and with the rim on opposite sides of said rib, and collapsing the rib to force the walls thereof toward each other to displace the connected ends of the spokes to lengthen the same.

8. The method of making metal tension wheels, which consists in providing a hub, and a rim with an annular hollow radial rib, connecting two ranks of spokes at their ends respectively with the hub and with the rim on opposite sides of said rib, and collapsing the rib to force the walls thereof into close and firm contact with each other to displace the connected ends of the spokes to lengthen the same.

9. The improved tension wheel consisting of a rim member, a hub member, and two ranks of spokes connected with said members, one of the members being permanently deformed with the spokes of the two ranks under a tension pull.

10. The improved tension wheel consisting of a hub, a rim, and two ranks of spokes connected with the hub and rim, the said rim being permanently deformed with the spokes of the two ranks under a tension pull.

11. The improved tension wheel consisting of a hub, a rim, and two ranks of spokes connected with the hub and rim, the said rim being provided between the two ranks of spokes with an annular rib permanently deforming the rim, and maintaining the spokes of the two ranks under a tension pull.

12. The improved tension wheel consisting of a hub, a rim and two ranks of spokes connected with the hub and rim, the said rim having the portion thereof between the ranks bent outwardly in the form of a rib with its side walls permanently deformed in close and solid contact with each other and maintaining the spokes of the two ranks under tension pull.

13. The improved wheel consisting of a hub, a rim and connected spokes, the metal of the rim being bent outwardly between its edges in the form of an annular radial fold, the side walls of which are maintained in close contact with each other and constituting in effect a solid radial rib.

In testimony whereof, I have affixed my signature in presence of two witnesses.

HENRY J. GERWE.

Witnesses:
JOHN H. PLOEHN,
ANDREW NEILSON.